United States Patent [19]
Schiefer et al.

[11] Patent Number: 5,884,175
[45] Date of Patent: Mar. 16, 1999

[54] HANDOVER FOLLOWING IN A MOBILE RADIO SYSTEM

[75] Inventors: Jan Schiefer, Bristol; David Arthur Stephenson, Chippenham, both of England; David Bonner, East Kilbride, Scotland; Steven Nicholas Bennett, Charlton Kings, England

[73] Assignee: Hewlett-Packard Company, Palo Alto, Calif.

[21] Appl. No.: 841,821

[22] Filed: May 5, 1997

[30] Foreign Application Priority Data

May 3, 1996 [EP] European Pat. Off. .............. 96303150

[51] Int. Cl.$^6$ ...................................................... H04B 7/00
[52] U.S. Cl. .......................... 455/436; 455/525; 455/67.1
[58] Field of Search ..................................... 455/436, 438, 455/439, 443, 524, 525, 560, 67.1, 424; 390/330, 331, 332

[56] References Cited

FOREIGN PATENT DOCUMENTS 0738091 4/1995 European Pat. Off. ..
0 738 091A1 10/1996 European Pat. Off. ..

OTHER PUBLICATIONS

Fingerie, Bernd–Michael ; GSM Signalling in Practice/ No. 124, Berlin, Germany, Sep. 1993.
European Search Report—EP–96–30–3150.
"GSM Signalisierung in der Praxis" XP000534209, 11450 ITG Specialist Report, Sep. 1993, No. 124, pp. 423–432, Berlin, Germany, with English Translation.

Primary Examiner—Nguyen Vo
Assistant Examiner—Hoa Huy Do

[57] ABSTRACT

A method is provided of following a communication transaction during which a communicating mobile station (12) is handed-over from one radio cell to another in a mobile radio system. The transaction is followed across the handover by monitoring signaling messages on the signaling paths in the mobile radio system to detect the occurrence of common parameters related to communication transactions subject to handover. By correlating these parameters it is possible to associate fragments of the same transaction that give rise to signaling messages on different signaling paths. Thus in the case of a GSM mobile radio system with monitoring of the A interfaces, the parts of a communication transaction split by a handover from one BSC (17A) to another (17Z), can be associated by correlating the RR3 Handover Command signaling units appearing on the signaling links (68,69) to the old and new BSCs (17A,17Z). This correlation can conveniently be done at a central station (42) to which the signalling path monitors (40A,40Z) send report messages when they detect handovers occurring. A similar correlation can also be done when monitoring the Abis interfaces.

20 Claims, 9 Drawing Sheets

FIG. 3A
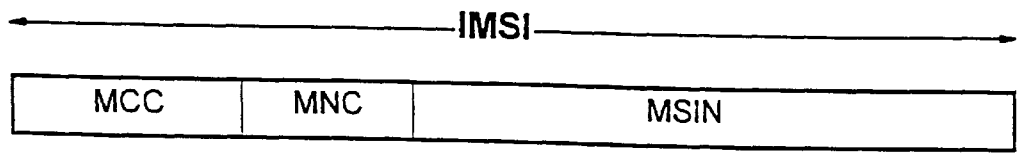
FIG. 3B
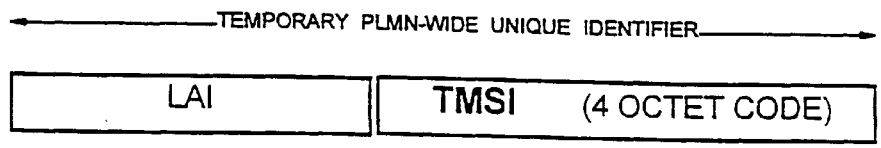
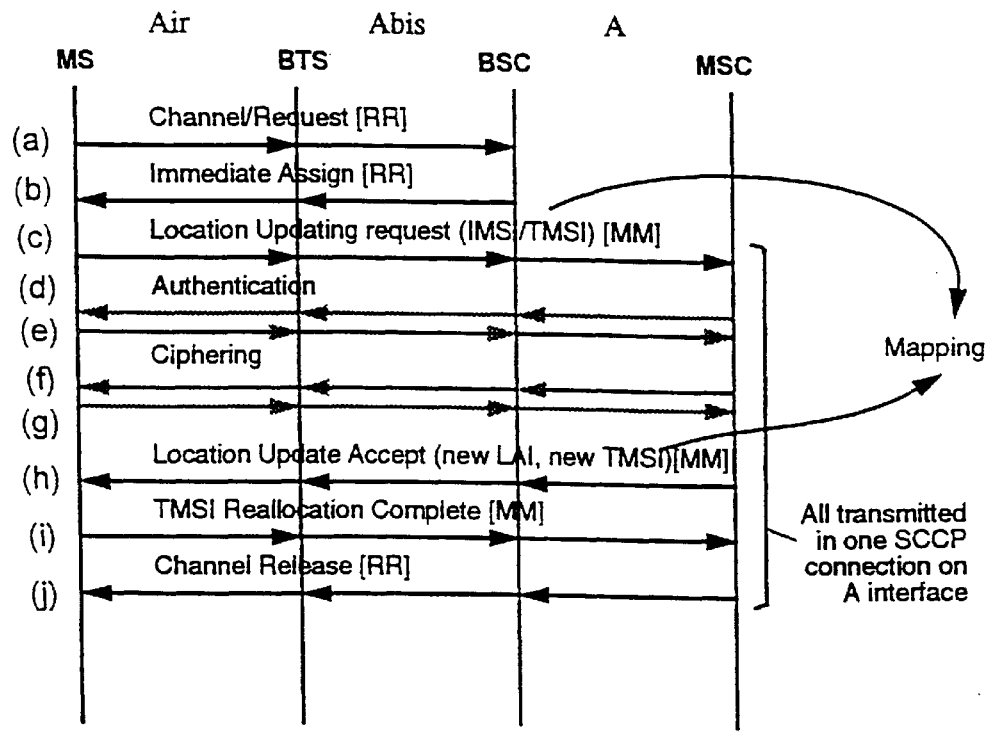
FIG. 4

HANDOVER FOLLOWING IN A MOBILE RADIO SYSTEM

TECHNICAL FIELD

The present invention relates to a method and apparatus for following a communication transaction across a handover in a mobile radio system; in particular, but not exclusively, the present invention relates to following a transaction across a handover in mobile radio systems such as systems operating according to the GSM, DCS1800 or PCS 1900 standards.

For convenience, systems operating according to the GSM and DCS1800 standards, including derivatives thereof, will hereinafter be referred to as "GSM-type" systems, DCS1800 systems themselves being derivative of GSM systems and exhibiting the same characteristics for present purposes; it should, however, be noted that the present invention is not restricted to GSM-type systems.

BACKGROUND ART

In a cellular mobile radio system, the fixed network part of the system is organized as a plurality of radio cells. During a communication transaction, a mobile station which is initially in communication with one radio cell may change cells by means of a handover process that ensures the orderly transfer of the communication transaction between cells. Within the fixed network part, a handover may result in a change in signaling path handling the passing of signaling messages to and from the mobile station.

For a variety of reasons, a network operator may be interested in following a communication transaction; for example, the operator may wish to find out how many transactions involve handovers or to associate pieces of information separately occurring during a transaction (such as the identity code given at the start of a transaction with a subsequently-assigned temporary identity code).

Of course, as part of its normal operation, the fixed network infrastructure follows communication transactions across handovers. However, as a practical matter, making this process or resultant derived information directly available to the network operator would requires substantial modification to existing infrastructure software with the consequent need to re-qualify the software and associated systems.

It is therefore an object of the present invention to provide a way of tracking communication transactions across handovers without requiring modification of the existing network infrastructure.

As will be more fully set out below, the present invention involves providing a monitoring method and apparatus that effects the desired following of transactions across handovers by monitoring signaling messages. Monitoring signaling messages is not new in itself and may be done using, for example, the Hewlett-Packard 37900D Signaling Test Set. However, as already noted, a handover may result in a change in signaling path carrying the signaling messages relevant to a transaction being followed; as a consequence, following a transaction across a handover requires substantially more than just monitoring messages on a single signaling path.

SUMMARY OF THE INVENTION

According to one aspect of the present invention, there is provided a method of following across a handover a communication transaction between a mobile station and a fixed network part of a mobile radio system that is organized as a plurality of radio cells, the mobile radio system including a plurality of signaling paths for passing signaling messages to and from the mobile station with the particular signaling path in use depending on which said radio cell is being used for communication with the mobile station, this latter cell being changed by a said hand-over which, where it involves a change in said signaling path, results in at least one predetermined parameter appearing with the same value in said signaling messages on both the old and the new paths; said method comprising the steps of:

(a) monitoring a first signaling path to detect signaling messages related to a first communication transaction that is to be handed-over away from a cell served by that signaling path, and extracting from these messages the value of said at least one predetermined parameter;

(b) monitoring a second signaling path to detect signaling messages relating to a second communication transaction subject to hand-over towards a cell served by that signaling path, and extracting from these messages the value of said at least one predetermined parameter;

(c) comparing the values of the said at least one predetermined parameter extracted in steps (a) and (b) and if these values are the same, determining that the first and second communication transactions are the same transaction.

Generally, said at least one predetermined parameter comprises a parameter related to the control of the handover of said same transaction from the cell served by the first signaling path to the cell served by the second signaling path. For example, said at least one predetermined parameter can comprise radio frequency and timeslot parameters for communication between the mobile station and the cell served by the second signalling path. Alternatively, said at one predetermined parameter may comprise a channel number and a handover reference number.

The extraction of this said at least one predetermined parameter may occur first either on the first signaling path or on the second signaling path and in this sense the order in which steps (a) and (b) are carried out is not critical to the present invention.

Preferably, step (c) is performed at a remote station and steps (a) and (b) each further involves sending the extracted value of said at least one predetermined parameter to the remote station.

Advantageously, the method further comprises the steps of:

deriving from the signaling messages on the first signaling path data related to the first communication transaction, and upon the first and second communication transactions being determined to be the same transaction in step (c), associating said data with the second communication transaction.

The aforesaid data is, for example, an operative identity code associated with the mobile station, this operative identity code typically being a subscriber identity code.

Preferably, steps (a) and (b) are concurrently effected for a plurality of signaling paths with step (c) being carried out for first and second communication transactions that experience hand-over at substantially the same time.

According to another aspect of the present invention, there is provided apparatus for monitoring a mobile radio system in order to follow across a handover a communication transaction between a mobile station and a fixed network part of the system that is organized as a plurality of radio cells, said mobile radio system including a plurality of signaling paths for passing signaling messages to and from the mobile station with the particular signaling path in use depending on which said radio cell is being used for communication with the mobile station, this latter cell being changed by a said hand-over which, where it involves a change in said signaling path, results in at least one predetermined parameter appearing with the same value in said signaling messages on both the old and the new paths; the apparatus comprising:

first monitoring means for monitoring a first signaling path to detect signaling messages related to a first communication transaction that is to be handed-over away from a cell served by that signaling path, the first monitoring means including means for extracting from these messages the value of said at least one predetermined parameter;

second monitoring means for monitoring a second signaling path to detect signaling messages relating to a second communication transaction subject to hand-over towards a cell served by that signaling path, the second monitoring means including means for extracting from these messages the value of said at least one predetermined parameter; and correlation means for comparing the values of the said at least one predetermined parameter extracted by the first and second monitoring means and if these values are the same, determining that the first and second communication transactions are the same transaction.

According to a still further aspect of the present invention, there is provided apparatus for monitoring a mobile radio system in order to enable the following across a handover of a communication transaction between a mobile station and a fixed network part of the system that is organized as a plurality of radio cells, said mobile radio system including a plurality of signaling paths for passing signaling messages to and from the mobile station with the particular signaling path in use depending on which said radio cell is being used for communication with the mobile station, this latter cell being changed by a said hand-over which, where it involves a change in said signaling path, results in at least one predetermined parameter appearing with the same value in said signaling messages on both the old and the new paths; said apparatus comprising:

monitoring means for monitoring a signaling path to detect signaling messages related to a communication transaction involved in a handover;

extracting means for extracting from the messages monitored by the monitoring means the value of said at least one predetermined parameter; and means for sending the value of said at least one predetermined parameter extracted by the monitoring means to a correlation station.

BRIEF DESCRIPTION OF DRAWINGS

An identity-code tracking method and apparatus capable of following a communication transaction across a handover in accordance with the present invention, will now be described, by way of non-limiting example, with reference to the accompanying drawings, in which:

FIG. 3A is a diagram illustrating the format of an IMSI subscriber identity code;

FIG. 3B is a diagram illustrating the format of a TMSI-based subscriber identity code;

FIG. 4 is a diagram illustrating the signaling messages passed between a mobile station and an MSC of the FIG. 1 system during a location update procedure;

BEST MODE FOR CARRYING OUT THE INVENTION

Overview of a GSM Network

Figure 1:
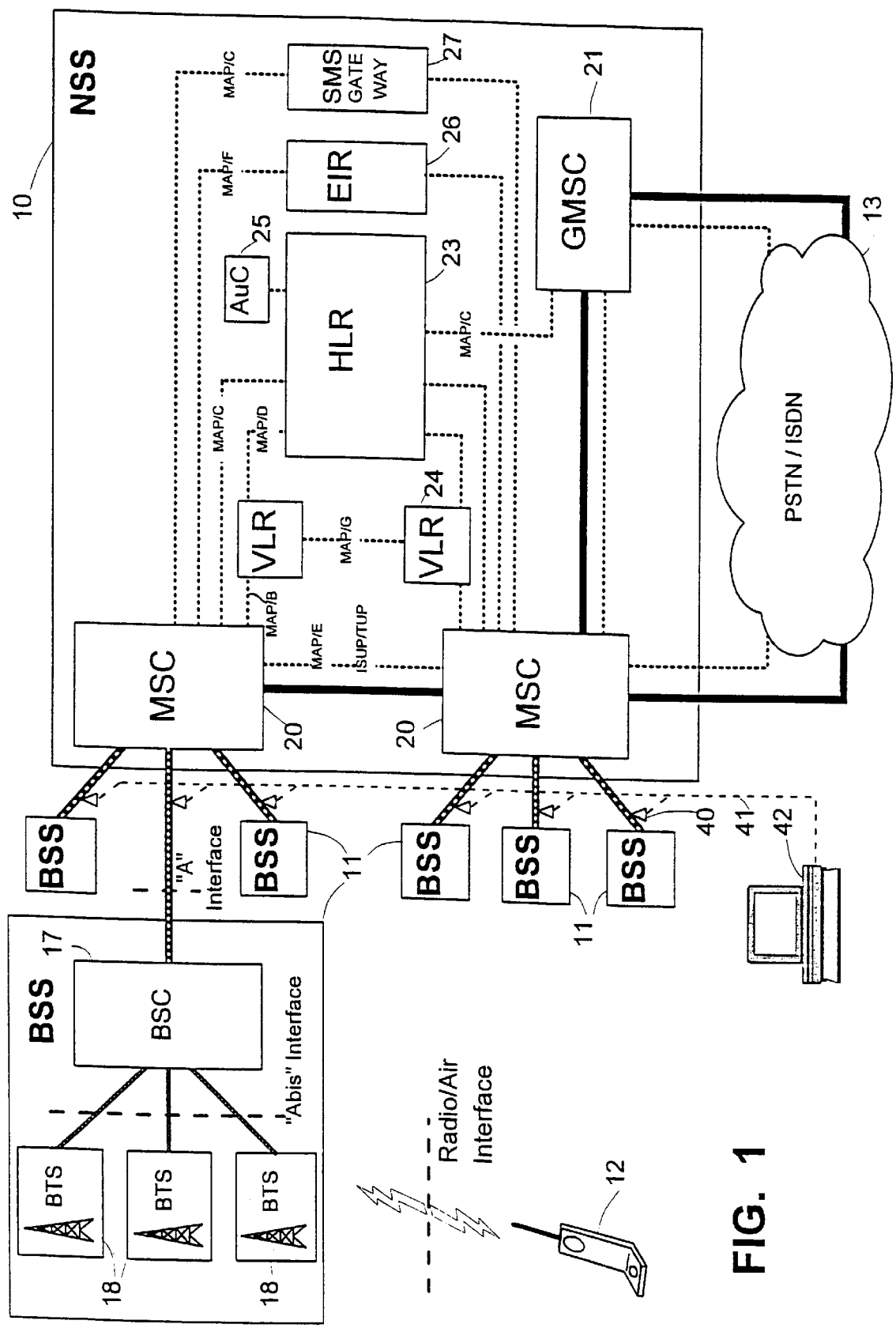
FIG. 1 is a block diagram showing the main components of a GSM cellular mobile radio system.

FIG. 1 is a diagram showing the main elements of a public land mobile network (PLMN) based on digital cellular radio technology; in particular, the FIG. 1 network is a GSM network.

The FIG. 1 network comprises a network and switching subsystem (NSS) 10 which connects with a plurality of base station subsystems (BSS) 11; the BSS provide radio communication with mobile stations 12 (only one of which is shown in FIG. 1). The NSS 10 also communicates with the fixed public network 13 (the public switched telephone network PSTN and integrated digital services network ISDN). Indeed the PLMN can be thought of as an access path to the PSTN/ISDN, though calls may also be wholly contained within the PLMN.

Each BSS 11 comprises a base station controller (BSC) 17, and a plurality of base transceiver stations (BTS) 18 each controlled by the BSC 17. Each BTS 18 has radio transmitters and receivers for providing radio coverage of a local area known as a 'cell'.

Signaling and user data (digitized voice and other digital data such as computer data) pass between each mobile station 12 and the BTS 18 of the cell in which the mobile station is located. As a mobile station moves from one cell to another, control of handover of communication with the mobile station from the BTS of the old cell to the BTS of the new cell, is effected by the BSC.

The radio interface between a mobile station and BTS is standardized within a particular system such as GSM. Similarly, the interface between each BTS 18 and its associated BSC 17, by which user data and signaling are exchanged between these elements, is also generally standardized (in GSM, this interface is known as the 'Abis' interface).

Each BSS 11 communicates with a mobile switching centre (MSC) 20 of the NSS 10, each MSC 20 generally being in communication with several BSS. The interface between a BSS and an MSC is again generally standardized, this interface being known as the 'A' interface in GSM.

In GSM networks, user data and signaling are multiplexed across the radio interface, the 'Abis' interface and the 'A' Interface. However, within the NSS, user data and signaling are handled separately. This is shown in FIG. 1 by depicting user-data paths in solid lines and signaling paths in dotted lines; when both use the same path, a solid line with superimposed white dots is used.

In the NSS, the user data is handled by the MSCs and for a given call, the user data will commonly traverse two MSCs 20. Although in FIG. 1 the MSCs 20 are shown as directly connected by a solid line, this should be understood merely as showing that user-data traffic can pass between the MSCs; in practice, whilst a direct connection is used where justified by traffic levels, MSCs may be connected through the intermediary of the fixed public network 13.

In addition to the MSCs 20, user data may also be handled in the NSS by what in GSM parlance is known as a gateway MSC (GMSC) 21. The purpose of the GMSC 21 is to handle calls set up in either direction between mobile stations and outside of the PLMN; thus for a call from outside of the PLMN towards a mobile station, the GMSC determines where the call should be routed to catch up with the mobile station. In practice, GMSC funtionality is often provided at each MSC.

The remaining components of the NSS 10 are concerned with control functions and these components communicate with each other, with the MSCs and GMSC, and with the fixed public network through signaling links using a signaling system generally based on the SS7 (CCITT Signaling System No.7) standard. Within the NSS 10 a GSM system uses the MAP (Mobile Application Part) protocols for non-circuit-related signaling traffic and the TUP (Telephone User Part) and ISUP (ISDN User Part) for circuit-related signaling traffic. Again, the signaling paths between components of the NSS 10 are not necessarily direct but will generally make use of the SS7 network associated with the fixed public network.

The components of the NSS not already described are:
- the Home Location Register (HLR) 23—this contains information about subscribers registered with the PLMN (such as the services available to a particular subscriber and the PLMN network address of the MSC where the subscriber is currently located);
- the Visitor Location Register (VLR) 24—generally, each MSC has its own associated VLR which holds both subscriber data about users currently visiting the area covered by the MSC, and data about the current location of each user within the MSCs coverage area;
- the Authentication Register (AuC) 25—this component is closely associated with the HLR and holds data providing for subscriber identification and encryption of calls;
- the Equipment Identify Register (EIR) 26—this stores information about the mobile stations 12 themselves;
- the SMS Gateway 27—in GSM, a special "Short Message Service" is available, this being provided through the SMS Gateway.

Three main control functions may be identified in regulating calls in the PLMN (the signaling traffic being the communication required to implement these functions). These three functions are:
- radio resource management—this is the task of establishing, maintaining and releasing stable connections between mobile stations and an MSC despite movements of a mobile station. This management function primarily involves the BSCs but also the BTSs and MSCs.
- mobility management—this is the task of maintaining up-to-date user location information so as to permit incoming calls to be routed to the appropriate mobile station; in GSM, the address of the MSC in the area of which a user is to be found, is stored in the user's HLR whilst the user's location within that area is held in the VLR associated with the MSC. This management function involves the MSCs/VLRs and the HLR.
- call management—this task involves, as well as the usual control of calls as found in the fixed public network, the routing of calls towards a mobile station when the location of the latter is initially not known. In GSM, for calls towards a mobile station from outside of the PLMN in which the user of the mobile station is registered, it is the task of the GMSC to find out from the home HLR of the user being called, where that user is and then appropriately route the incoming call. The call management function involves the MSC/VLR, HLR and GMSC.

Figure 2:
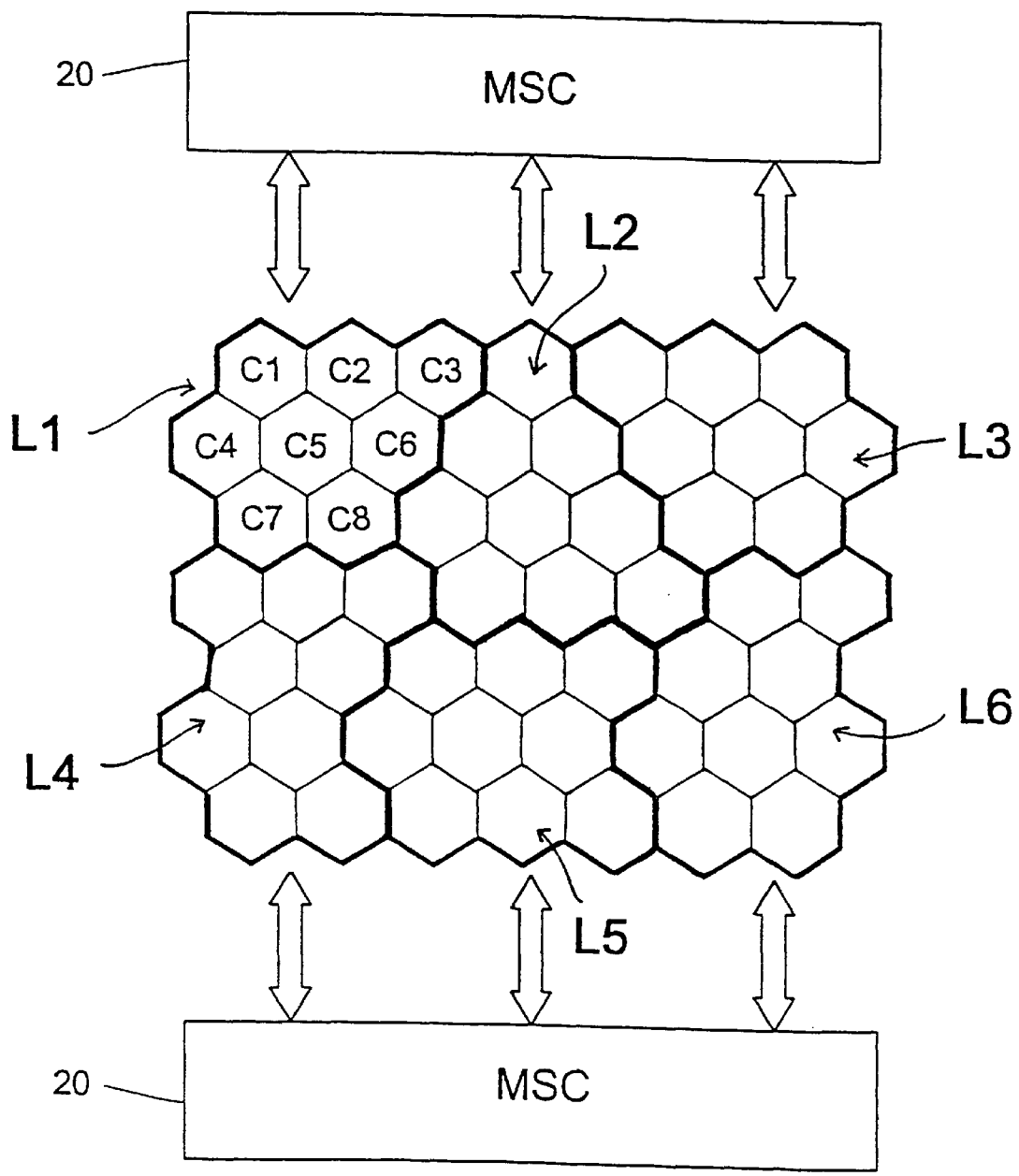
FIG. 2 is a diagram illustrating the relationship between radio cells and location areas in the FIG. 1 system.

Location Areas and Location Updating representing a corresponding radio cell, that is, the coverage area of a BTS (assuming that each BTS only covers one area). In FIG. 2 only eight cells have been specifically labelled, these being cells C1 to C8.

Groups of radio cells (generally, but not necessarily, physically adjacent) are logically associated, the resultant coverage areas being referred to as "location areas". Thus, cells C1 to C8 are grouped together and cover a location area L1. In FIG. 2, six location areas L1 to L6 are shown.

In GSM systems, the cells associated with each MSC (that is, the cells associated with the BTSs of the BSSs connected to the MSC concerned) are divided into one or more location areas with the only limitation being that no location area can contain cells associated with more than one MSC. Thus, in FIG. 2 the cells associated with the upper MSC 20 form three location areas L1 to L3, whilst the cells associated with the lower MSC 20 form a further three location areas L1 to L6.

It is worth nothing that the GSM standards do not themselves require that all the cells associated with a particular BSS 11 are in the same location area but this will often be the case.

The purpose of grouping cells into location areas is to facilitate the task of mobility management. In order for a mobile station to be located to receive an incoming call, two basic approaches are possible. Firstly, a paging message could be transmitted in every cell of the PLMN in order to have a searched-for mobile station respond to identify its position; such an approach is, however, very inefficient. The second approach is to have the PLMN store location information on each user which is periodically updated as the user (or rather, his mobile station) moves around the network. This latter approach is the one most usually taken. However, if a location update is effected every time a mobile station moves from one cell to another, a very large amount of signaling traffic would be created. In order to avoid this problem, GSM uses the concept of a location area with a mobile station only initiating a location update when it determines it has changed location area. Since the PLMN now knows the location area of each mobile station, when it is necessary to route an incoming call to a particular mobile, it is only necessary to transmit a paging message in the cells of the relevant location area.

As previously indicated, location information is actually stored in two parts with the address of the MSC in whose area a mobile station is currently located being stored in the HLR, and the local location information (that is, current location area) being stored in the VLR associated with that MSC.

A mobile station can tell when it has changed location area because the BTS of each cell periodically transmits the identity of the cell and location area in which it is located; by storing this location area information, the mobile station can readily tell when it changes location area.

Upon detecting a location area change, the mobile station transmits a "location update request" which is received by the BTS of the cell in which the mobile station is currently to be found. This request is then passed via the BSC associated with the BTS, back to the relevant MSC. The MSC then updates the location information held for the mobile station in the VLR associated with the MSC. In the event that a mobile station moves from a location area covered by one MSC to a location area covered by another MSC, a changeover process is effected between MSCs which also involves the HLR being updated with the address of the MSC into whose area the mobile station has now moved.

A mobile station is also arranged to send out a location update request message, if it receives an indication from the network that it is not known to the VLR in whose coverage area it is currently located.

Finally, in order to ensure that up-to-date location information is maintained on mobile stations, and also to enable the databases in the HLR and VLR to be rebuilt in case of data loss, each mobile station is arranged to send a location update request message (a "periodic" location update request) if it has not sent such a request within a predetermined, network configurable, amount of time.

It should be noted that a mobile station will only generate a location update request from its idle mode and not when it is already in its dedicated mode. Whenever a location update request is generated and sent then, regardless of the reason for the request, the VLR will respond either with a Location Update Accept or Location Update Reject message, as appropriate.

User Identity—IMSI and TMSI

Within the international GSM community, each subscriber is uniquely identified by a number, the IMSI (International Mobile Subscriber Identity). This digits or less an digits or less and as shown in FIG. 3A comprises a 3-digit mobile country code (MCC), a 2-digit mobile network code (MNC) giving a subscriber's home PLMN, and a mobile subscriber identification number (MSIN) identifying the subscriber in his home PLMN. The IMSI is not the telephone number of the subscriber—many telephone numbers can be assigned to a single subscriber.

The IMSI of a subscriber is held in a subscriber identity module (SIM) that plugs into a mobile station. Each time the mobile station accesses the PLMN, the IMSI held in the associated SIM is provided to the PLMN (either directly, or indirectly in the form of a TMSI as will be explained below). The IMSI allows the PLMN to access the HLR where the subscriber is registered to retrieve subscriber-specific data and to record the MSC in whose area the mobile station is currently located, according to context.

Sending the IMSI over the inherently insecure radio path at each PLMN access is undesirable for confidentiality and security reasons. Accordingly a temporary identity number known as Temporary Mobile Subscriber Identity (TMSI) is generally used as an alias for the IMSI. The TMSI is a four octet code allocated by the PLMN on a location area basis and, at any given time, unambiguously identifies the subscriber in the location area concerned. When the mobile station changes location area, the TMSI is generally also changed. A TMSI is only unique within a location area and needs to be combined with the LAI (location area identity) of the relevant location area to provide a PLMN-unique identifier (see FIG. 3B). However, a TMSI is generally used in a context where the location area concerned is either already known or implied.

TMSIs are managed by the current MSC/VLR. For a given location area, a TMSI is allocated to a mobile station when it registers in the location area; this TMSI is released when the mobile station leaves the location area. A TMSI can be allocated either by a dedicated TMSI Reallocation Command passed from the MSC/VLR to the mobile station (and acknowledged by a TMSI Reallocation Complete message) or as part of a Location Update Accept message following on from the mobile station making a Location Update Request upon entering a new location area. TMSI cancellation is usually implicit; in particular, for the mobile station, allocation of a new TMSI cancels any previously allocated TMSI as does receipt of a Location Update Accept message in a new location area.

When a mobile station changes location area, the new TMSI may be completely different from the TMSI used in the previous location area, or it may be the same (the associated LAIs then providing differentiation). It is also possible to explicitly cancel an existing TMSI by sending the TMSI Reallocation Command using the IMSI; in this case, the mobile station reverts to using the IMSI to identify itself to the PLMN until next it is allocated a TMSI.

Clearly, where a mobile station first identifies itself using an IMSI and the corresponding MSC/VLR proceeds to allocate a TMSI, that MSC/VLR knows the IMSI and can therefore access the subscriber's HLR. However, if the mobile station moves to a new location area covered by a different MSC/VLR, this latter will be presented with a TMSI that does not contain sufficient information for the MSC/VLR to access the subscriber's HLR. The new MSC/VLR could make a specific Identify request to the mobile station to have it return its IMSI; however, this compromises the sought-after security. Instead, therefore, the new MSC/VLR generally asks the old MSC/VLR for the IMSI, this being possible because when the mobile station sends the TMSI to the new MSC/VLR it also sends the LAI of the old location area which enables the old MSC/VLR to be identified.

When a TMSI has been allocated and not cancelled, it is retained by the mobile station even when turned off.

Tracking Subscriber Identity

A mobile subscriber's identity is notified to the PLMN by the mobile station being used by the subscriber, whenever the mobile station seeks to establish a connection, that is, in the following circumstances:

CM service request (subscriber initiated service request)

Paging response (mobile station response to a paging message)

Location updating (notification of a new location area by mobile or periodic update)

IMSI Attach and Detach (on switch on and off of mobile station)

CM re-establishment request (following loss of connection)

The subscriber identity given by the mobile station will, of course, be the current TMSI (the current LAI being also sent) or, if none exists, the IMSI; this subscriber identity is referred to below as the operative subscriber identity. The mobile station may also supply the IMSI in response to an Identity request from the PLMN (the identity request may also be used to get the current TMSI).

When subscriber identity is being considered on a PLMN-wide basis, it will be appreciated that for an operative subscriber identity comprising a TMSI, the relevant LAI explicitly or implicitly forms part of the operative subscriber identity; however, where subscriber identity is only being considered within a particular location area, the LAI is not needed.

The operative subscriber identity is changed by the PLMN either by the TMSI Reallocation command or as part of a Location Update Accept message, as already discussed.

Keeping track of the operative subscriber identity for a particular subscriber as identified by an IMSI is an inherent operation of the PLMN infrastructure, this mapping being maintained by the MSC/VLR in which the subscriber is currently registered. In theory, this enables the behavioral characteristics of a particular subscriber to be monitored. However, as a practical matter, accessing the information in the MSC/VLR for non-standard purposes requires substantial modification to existing software with the consequent need to re-qualify the software and associated systems. It is therefore attractive to be able to track the current operative subscriber identity of a particular subscriber using a separate monitoring system that does not rely on the main PLMN infrastructure components but can perform the required tracking by monitoring signalling traffic in the PLMN.

Unfortunately, the messages from the PLMN to the mobile station instructing it to change the operative subscriber identity to a given value, do not include the old subscriber identity so that simply identifying such messages is of little value.

Accordingly, in the identity-code tracking apparatus to be described hereinafter, a message parameter common to both the connection establishment messages and to messages changing the operative subscriber identity is used to establish a link between these messages thereby enabling changes in the operative subscriber identity to be mapped.

In a first embodiment of the identity-code tracking, signalling messages on the A interface are monitored and the sought-after linkage between connection-establishment messages that include the current operative subscriber identity, and subsequent messages that change the operative subscriber identity, is provided by the fact that these messages will be passed between a BSC and the corresponding MSC by a connection-oriented protocol, namely the SS7 SCCP protocol in class 2 mode. More particularly, the initial connection-establishment message passed from the BSC to MSC initiates the set up of an SCCP connection and in doing so passes the MSC a local reference that the MSC must use in subsequent communications with the BSC for the transaction to which the connection establishment relates. In replying to the initial message from the BSC, the MSC uses the BSC local reference as the destination source reference for the reply and includes its own local reference as the source local reference of the reply. In subsequent communications for the transaction, the BSC uses the MSC's local reference as the destination local reference for its messages to the MSC. By noting these local references, it is possible to identify all messages relating to the same SCCP connection thereby enabling messages changing the operative subscriber identity to be linked to the initial connection establishment messages. The association of local references with a particular SCCP connection only lasts for the duration of that connection.

In a similar manner, in a second embodiment of the identity-code tracking apparatus, signalling messages on the Abis interface are monitored and the channel number parameter in these messages is used to provide the linkage between connection-establishment messages that include the current operative subscriber identity and subsequent messages that change the operative subscriber identity. As the channel number may be changed during a transaction (to change from an initial signalling channel to a traffic channel), it is necessary also track such channel number changes.

First Embodiment-Detailed Signalling Example

By way of example of the general manner of operation of the first embodiment, consider the case where a mobile station in idle mode determines that it is in a new location area. This results in the mobile station making a Location Update Request with the current operative subscriber identity; if all is well, the PLMN will respond with a Location Update Accept including a new TMSI to be used as the operative subscriber identity.

More particularly, and with reference to FIG. 4, the mobile station first transmits a Channel Request on the RACH channel which is picked up by a BTS and passed as a Channel Required message to the associated BSC (line ('a'), FIG. 4). The BSC responds by choosing a free channel and activates it in the BTS (this activation and the acknowledgement from the BTS to the BSC are not depicted in FIG. 4). Thereafter, the BSC initiates the sending of an Immediate Assignment message on the PAGCH channel telling the mobile station the details of the channel it has been allocated for further signalling communication (line b).

The mobile station then sets its reception and transmission configuration to the assigned channel and establishes a link-level connection with the BTS on the new channel by sending a SABM frame; this SABM frame also carries the initial message which in the present example includes the Location Update Request and the operative subscriber identity. The Location Update Request is then passed from the BTS to BSC in an Establish Indication message. The BSC on receipt of this message sets up an SCCP connection with the corresponding MSC by means of a Connection Request message onto which the Location Update Request is generally piggybacked (line (c) in FIG. 4).

Figure 5:
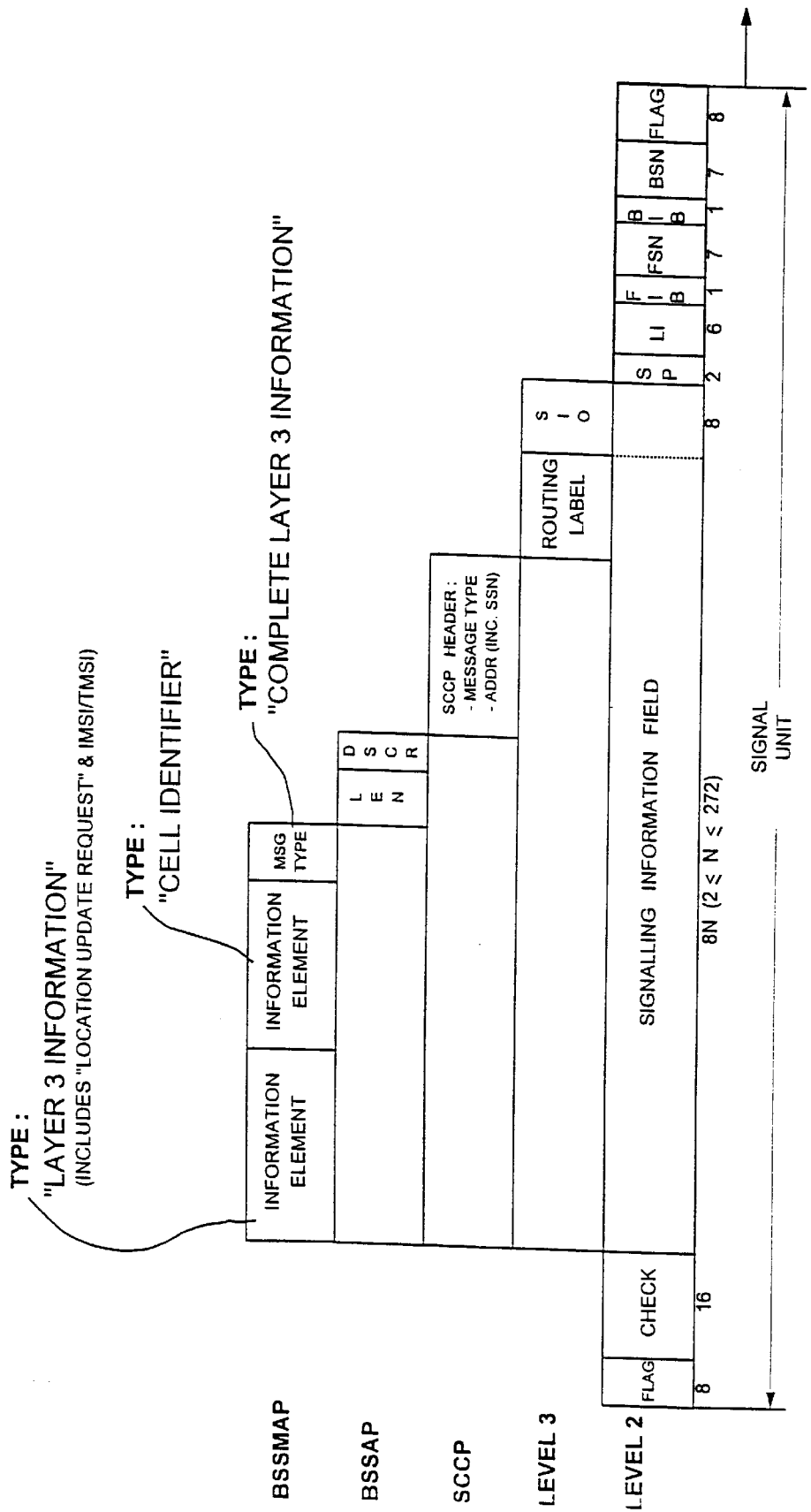
FIG. 5 is a diagram illustrating the layered format of the message used to carry the location update request in FIG. 4.

The format of this first message from the BSC to MSC is illustrated in FIG. 5. As for all messages on the 'A' interface, the SS7 SCCP (Signaling Connection Control Part) and underlying MTP (Message Transfer Part) provide the transport service. More particularly, information is transported in MTP level 2 signaling units, the composition of which is a Flag field, a Backward Sequence Number FSN field, a Backward-Indicator bit BIB, a Forward Sequence Number, FSN field, a Forward-Indicator bit FIB, a Length Indicator LI, a Spare SP field, a Service Information Octet SIO, a Signaling Information Field SIF, a Check field, and a terminating Flag field. MTP level 3 information is contained in the SIO and in a routing label forming part of the level 2 signaling information field. The routing label includes source and destination addresses for the signaling unit in terms of point codes. Above MTP level 3 is the SCCP layer for carrying information according to a required service type (in this case, connection-oriented). An SCCP header includes further addressing information that, inter alia, specifies what is termed a "subsystem number" for identifying the user of the transport service provided by the SCCP. In the present case, the user is the Base Station Subsystem Application Part (BSSAP) peer-to-peer protocol operating between the BSS and MSC concerned. BSSAP messages are identified by a subsystem number of "FE" in hex. The SCCP header also normally includes both the afore-mentioned source and destination local references for the connection concerned though, of course, for the present Connection Request message only the source local reference (for the BSC) will be present as this message is the initial message for the connection.

BSSAP is sub-divided into two parts, each BSSAP message being associated with one or other part as indicated by a discriminator octet (DSCR in FIG. 5). These two parts are a BSS Management Application sub-part (BSSMAP) which is used for radio resource (RR) and BSC management; and a Direct Transfer Application sub-part (DTAP) which is used for the transfer of call control management (CM) and mobility management (MM) messages. Location update requests are related to mobility management and it might therefore be expected to find such requests embedded in DTAP messages. In fact, location update requests are embedded in BSSMAP messages. The reason for this is that each location update request requires the establishment of a new radio connection between the mobile station concerned and the relevant MSC, and the establishment of such a connection is a radio resource management issue. Indeed, whenever a new radio connection is established, the "initial message" concerned with that connection is piggy-backed onto the RR message on the 'A' interface involved in setting up the connection through to the relevant MSC. Initial messages, including Location Update Requests, are carried in BSSMAP "Complete Layer 3 Information" messages, these latter being indicated by a message type octet '01010111' (the rightmost bit being the first bit of the octet). Each "Complete Layer 3 Information" message comprises two information elements, namely Cell Identifier and Layer 3 Information. It is the "Layer 3 Information" information element that actually contains the Location Update Request as well as the operative subscriber identity (for a TMSI, the old location area identifier LAI, which is an element of the current TMSI, can also be found in this information element). The "Cell Identifier" information element includes the current location area of the mobile station.

According to the first embodiment of the identity-code tracking apparatus a monitor probe monitoring the BSC/MSC link is arranged to detect all initial messages such as that illustrated in FIG. 5 and extract the operative subscriber identity from the Layer 3 Information element as well as the SCCP local reference of the BSC. This local reference is subsequently used by the monitor probe to identify all messages relating to the same SCCP connection until the latter is taken down.

Returning now to FIG. 4, following receipt of the Location Update Request by the MSC, authentication and ciphering messages may, optionally, be exchanged between the mobile station and the MSC (lines (d) to (g)). The probe monitoring the relevant BSC/MSC link knows from the source local reference or destination local reference (depending on message direction) that these messages relate to the SCCP connection associated with the location update transaction but by monitoring the message types, the probe determines that the messages do not concern modification of subscriber identity.

In due course, the MSC sends a Location Update Accept message which, in the present example, also sets a new TMSI (line (h) in FIG. 4). This message is detected by the monitor probe as associated with the SCCP connection of interest and this allows the new TMSI to be linked with the old operative subscriber identity, providing the sought-after mapping. The Location Update Accept message, being a mobility management message (which is not also an initial message) is carried in a DTAP message on the A interface.

Upon receipt of the Location Update Accept message including the new TMSI, the mobile station returns a TMSI Reallocation Complete message (line (i) in FIG. 4); this message is also carried in a DTAP message on the A interface. Finally, the MSC sends a Clear command in a BSSMAP message piggybacked on an SCCP Release message. The BSC passes on the Release Command as a Channel Release message (line (j) in FIG. 4), thereafter sending back a Clear Complete message to the MSC in a BSSMAP message piggybacked on an SCCP Release Complete message. This release complete message and subsequent release messages between the mobile station, BTS and BSC are not shown in FIG. 4. The monitor probe on the A interface detects the SCCP connection release messages and cancels its record of the SCCP connection.

Figure 6:
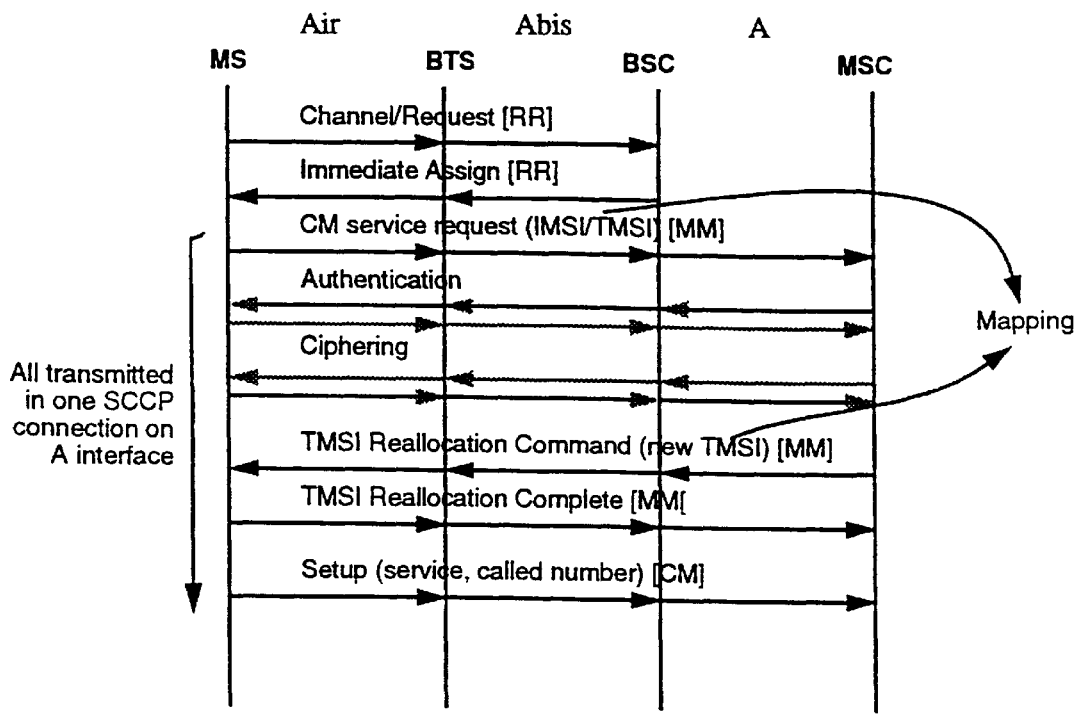
FIG. 6 is a diagram illustrating the signaling messages passed between a mobile station and an MSC of the FIG. 1 system during a subscriber-initiated service request procedure.
Figure 7:
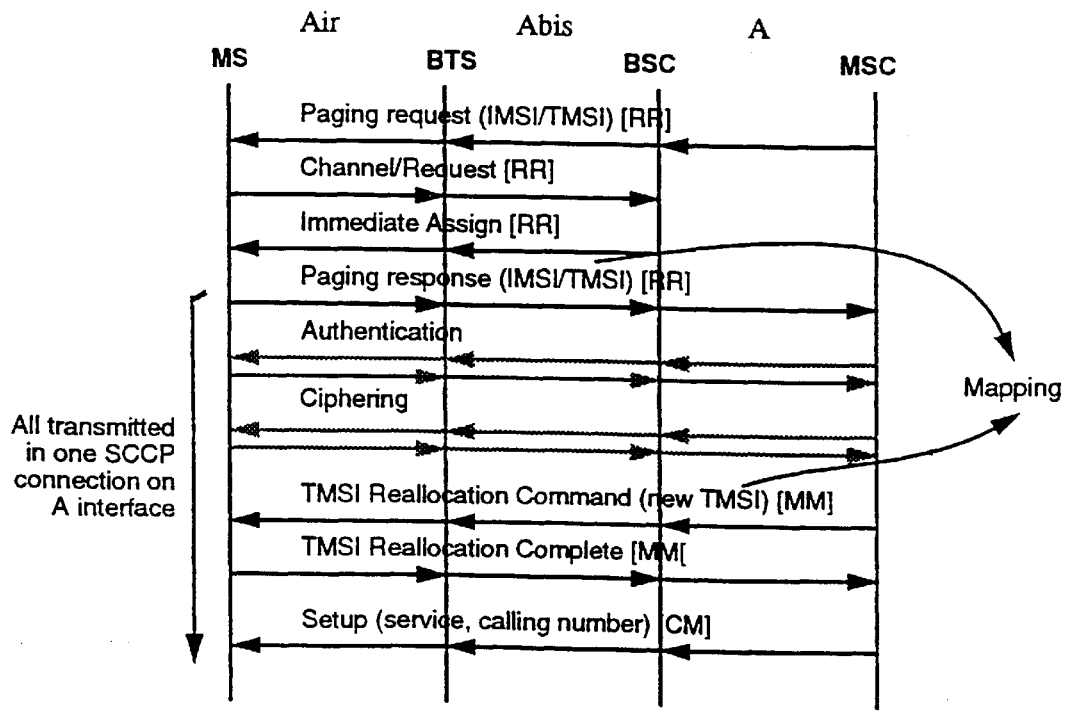
FIG. 7 is a diagram illustrating the signaling messages passed between a mobile station and an MSC of the FIG. 1 system during a paging response procedure.

FIGS. 6 and 7 are further examples similar to FIG. 4 showing the mapping between a subscriber identity operative at the time of connection establishment, and a subsequently-assigned TMSI, the linkage between the relevant messages being established through the local references of the SCCP connections concerned. FIG. 6 relates to a subscriber-initiated service request and FIG. 7 relates to a paging-initiated response from the mobile station. In both cases, the MSC sends a TMSI Reallocation Command which the mobile station acknowledges in a TMSI Reallocation Complete message; both messages are carried in DTAP messages on the A interface.

First Embodiment—Basic Implementation

As illustrated in FIG. 1, each 'A' interface is monitored by a respective monitor probe 40. These monitor probes 40 extract subscriber identity information from the messages on the 'A' interface and pass this information in report messages back to a central station 42 where further processing is carried out. Communication between the monitor probes 40 and the central station 42 is effected over a network 41 that may be a dedicated network or an existing one such as the operations and management network associated with the main network.

Figure 8:
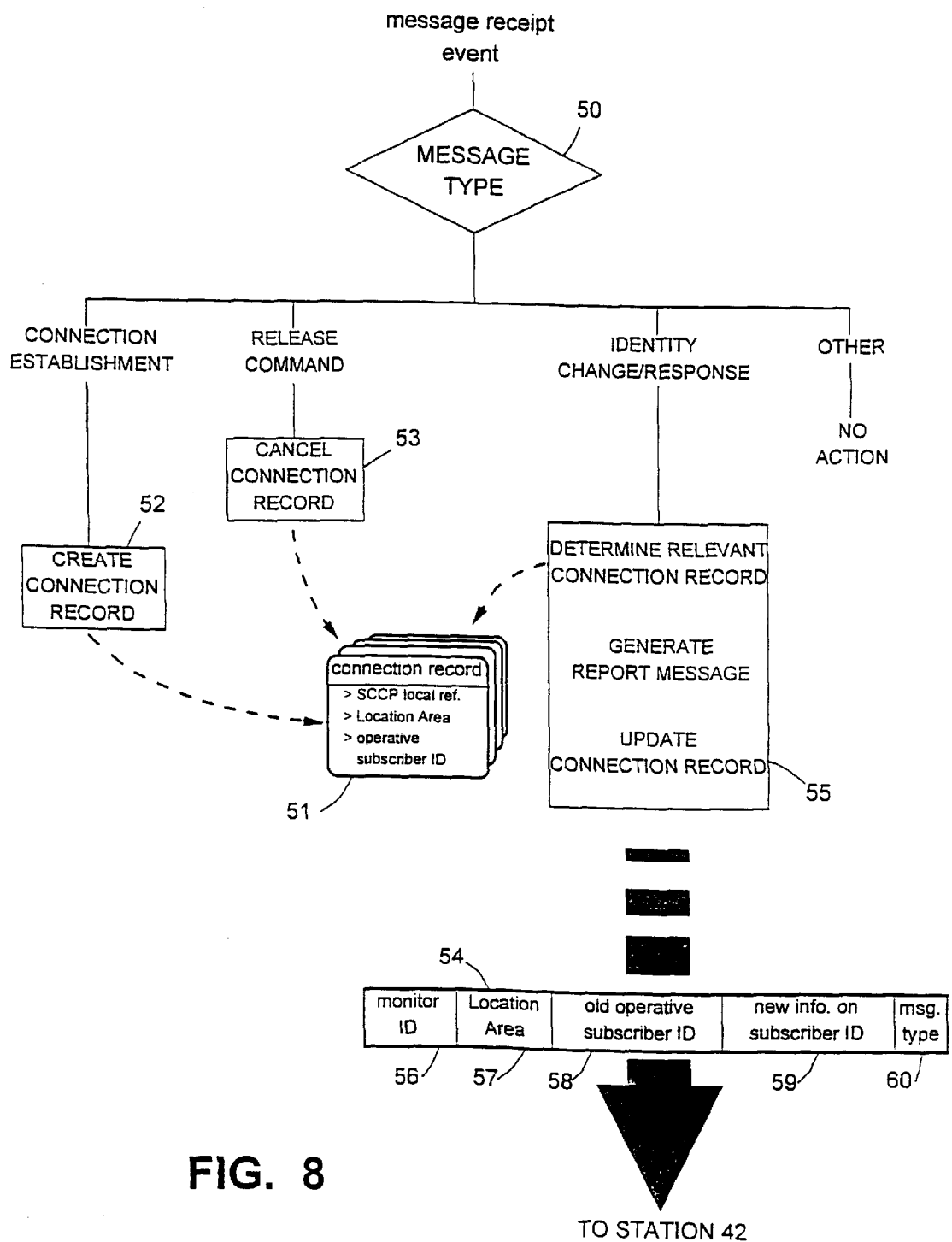
FIG. 8 is a diagram illustrating the processing in a monitor probe of messages detected as carrying subscriber identity information, this processing including the generation of report messages.

FIG. 8 illustrates the general operation of a monitor probe 40. On receipt of a message, the probe 40 decodes the message to determine its type (step 50). If the message is an "initial message" concerning connection establishment, the probe 40 creates a connection record 51 for the SCCP connection being set up and stores in this record the following elements (step 52):

the location area of the cell in which the mobile station is currently located, this information being extracted from the Cell Identifier information element of the monitored initial message (in certain cases, this information may not be present);

the operative subscriber identity (IMSI, or TMSI plus the LAI of the location area in which the TMSI was allocated) given in the Layer 3 Information information element of the monitored initial message; and the BSC local reference for the SCCP connection.

If the monitored message is a Release Command, the probe 40 uses the destination local reference to identify and cancel the corresponding connection record 51 (step 53).

Where the monitored message changes the operative subscriber identity (a TMSI Reallocation command or a Location Update Accept message) or gives the true subscriber identity (in a Identity Response message), the monitor probe 40 first determines the corresponding connection record from the appropriate SCCP local reference and then generates a report message 54 to report the new information on subscriber identity to the central station 42 (step 55). This report message 54 comprises a probe ID field 56 identifying the probe, a field 57 containing the current location area LAI as held in the corresponding connection record 51, a field 58 holding the old operative subscriber identity as held in the connection record 51, a field 59 containing the newly detected subscriber-identity information, and a report type 60 indicating whether the report message concerns an identity change or is reporting an identity response message. In the case of an identity change, the field 59 will contain the new operative subscriber identity (either the IMSI, or more probably, a new TMSI and the current LAI). In the case of an Identity Response message containing an IMSI, the field 59 contains the IMSI (in fact, if the operative subscriber identity is also the subscriber IMSI, no report message is generated). Each of the fields 58, 59 will typically be compound, comprising both an indicator of identity type (IMSI or TMSI+LAI) as well as the identity itself (even without such a type indicator, it would be possible to distinguish between the two identity types by their length but it is more convenient to use an indicator).

With regard to the identity change messages, the output of the report message is preferably deferred until a TMSI Reallocation Complete message acknowledging the change is detected by the probe 40 for the relevant SCCP connection.

As well generating the report message 54, in step 55 monitor also updates the relevant report record with any pertinent newly-detected information. Thus, if the operative subscriber identity has been changed, this new operative identity is stored in the connection record in place of the previously-stored operative subscriber identity. Furthermore, where a Location Update Accept message or TMSI Reallocation command is being processed by the monitor 40, since both these message types include the current location area identity, the monitor 40 also takes the opportunity to update the connection record 51 with this information, replacing the previous entry.

For message types other than those discussed above, the monitor probe 40 need take no action in respect of subscriber identity tracking (except in relation to handovers, as discussed in the following section). However, as it may be useful to keep track of the current location area of a mobile station, provision can also be made for reporting changes in location area that are not associated with a change in subscriber identity (this can occur if the IMSI is being used in both the old and new location areas). More particularly, if a Location Update Request is detected followed by a Location Update Accept not including a Reallocation command and an explicit TMSI Reallocation command does not follow within a predetermined timeout period, then a report message 54 is generated to report the new location area of the mobile station in field 57; in this case, field 60 can be arranged to indicate that the report message is simply reporting a location area change.

Figure 9:
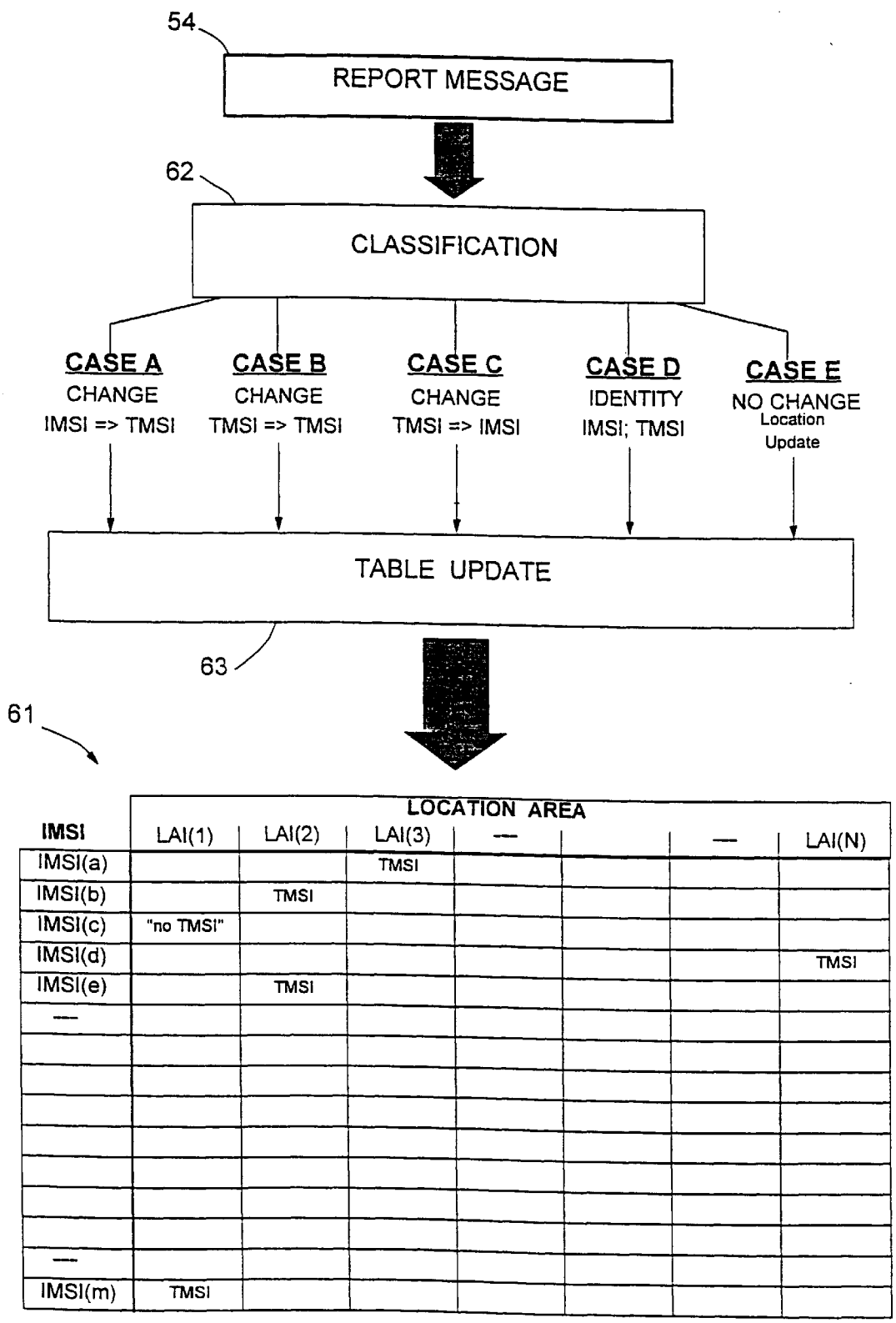
FIG. 9 is a diagram illustrating the processing of report messages received from monitor probes to update a table associating IMSIs with corresponding TMSIs.

Turning now to a consideration of the operation of the central station 42, this station maintains a table 61 (see FIG. 9) which includes an entry for each known IMSI, IMSI(a) to IMSI(m), this entry giving by location area LAI(l) to LAI (N), the current operative TMSI, if any, corresponding to the IMSI concerned.

On receipt of a report message 54 from any one of the monitor probes 40, the central station 42 classifies (step 62) the information it contains into one of five cases according to the contents of the field 60 and of the fields 58 and 59:

Case A—the operative subscriber identity has been changed from an IMSI to a TMSI;

Case B—the operative subscriber identity has been changed from a TMSI to a new TMSI (potentially in a different location area);

Case C—the operative subscriber identity has been changed from a TMSI back to the IMSI;

Case D—the IMSI of a subscriber is being reported together with the current operative TMSI;

Case E—location area has been updated without a change of the operative subscriber identity.

The station 42 then proceeds to update the table 61 (step 63) in dependence on its classification of the reported information. The update procedure for each case is as follows:

Case A: IMSI to TMSI Change—The table 61 is first searched for the IMSI. If the IMSI is located, any existing TMSI that might be present in the IMSI entry is removed and the new TMSI is added under the appropriate location area. If the IMSI is not found, a new table entry is created for the IMSI and the new TMSI entered according to its location area.

Case B: TMSI to TMSI Change—The table 61 is first searched for the old TMSI (contained in message field 58), this search being facilitated by the organization of the table by location area, the location area of the old TMSI being known. If the old TMSI is not found in the table, then the corresponding IMSI must still be unknown in which case no entry is possible and the updating operation is terminated. Assuming, however, that the old TMSI is found, the new TMSI is inserted into the same IMSI entry under the appropriate location area and the old TMSI is removed.

Case C: TMSI to IMSI Change—The IMSI is first searched for in table 61, and if found, any TMSI entered in the IMSI entry is removed. If the IMSI is not found in the table, a new IMSI entry is added without any TMSI (a 'no TMSI' indication can optionally be added under the appropriate location area in which event in Case A this indication would need removing when a TMSI was allocated).

Case D: IMSI and Operative TMSI reported—This case can be handled in the same manner as Case A above.

Case E: Location Update reported—This case simply involves the subscriber identity entry (here, generally a "no TMSI" indication) being moved to the appropriate location area column of table 61.

By updating the table 61 in this way, the central station can keep track of the current operative subscriber identity for all subscriber's whose IMSIs are known. Of course, as will be appreciated by persons skilled in the art, it would also be possible to arrange for changes in TMSI to be tracked even if the corresponding IMSI was not known. The table also enables the current location area of the subscriber to be tracked.

First Embodiment—Dealing With Handovers

In the foregoing, it has been assumed that each transaction only involves one SCCP connection—in practice, as a subscriber moves, the mobile station may pass from one cell to another and this may result in a change in BSC which, of course, involves the original SCCP connection being taken down and a new one established. Whilst there are well known handover procedures for coping with changes in cell during the course of a communication session, changes in SCCP connection can impact the tracking method described above.

More particularly, it is quite likely that no messages will appear on the new SCCP connection to give the operative identity code whereas a TMSI reallocation message could be issued changing the operative identity code; in such a situation, the tracking the old and new SCCP connections so that the operative identity code known for the old SCCP connection can be transferred across into the record established for the new connection.

To achieve this, the monitor probes 40 are arranged to monitor hand-over related signalling on the A interfaces, so as to collect common parameters that appear on both an old SCCP connection about to be taken down in respect of a communication session and on a new SCCP connection established to take over a communication session; the values of these common parameters are then compared to match up old and new SCCP connections related to the same communication session.

Figure 10:
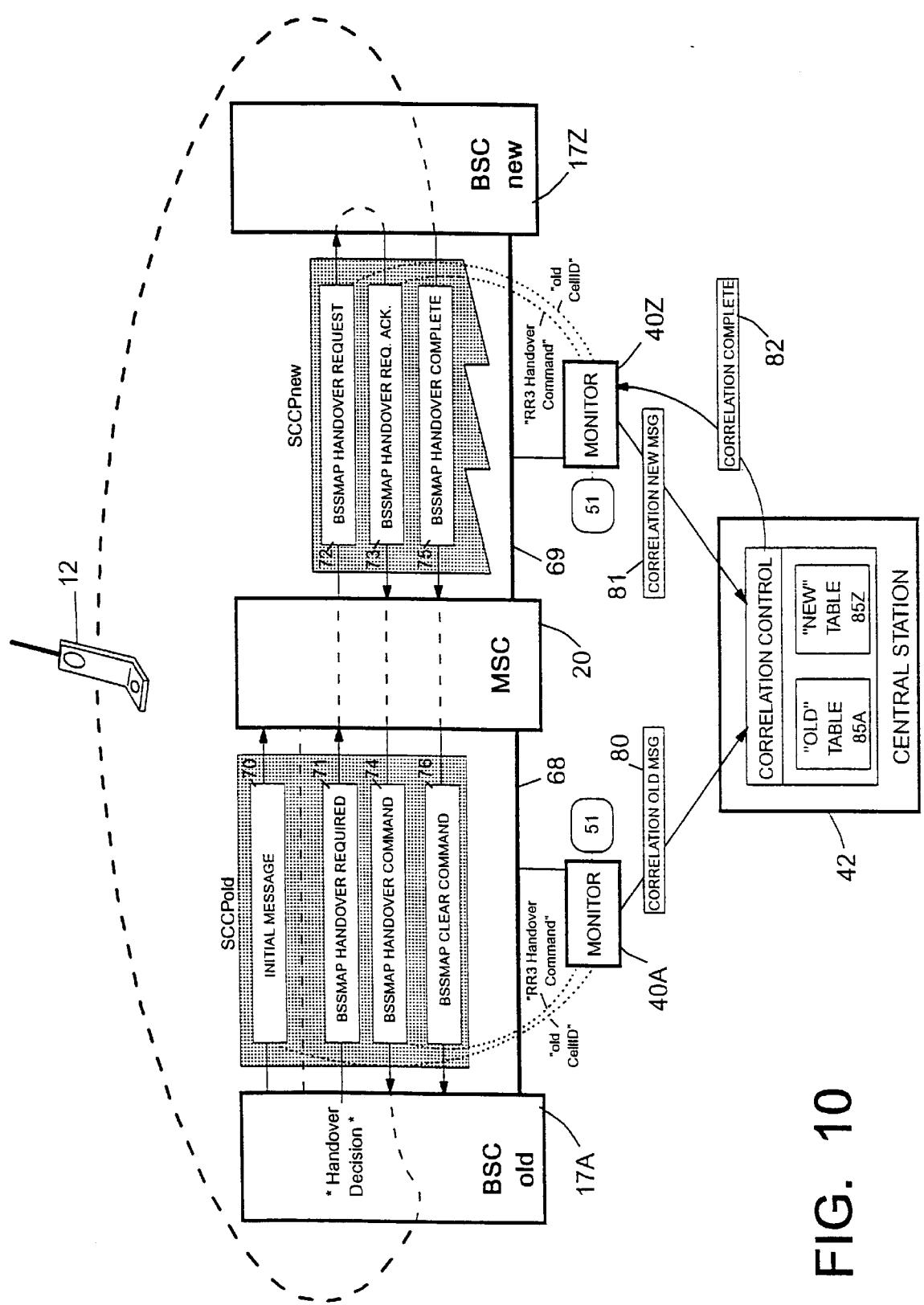
FIG. 10 is a diagram illustrating the signaling messages passed between an MSC and two BSCs of the FIG. 1 system during a handover operation involving a change in BSC.

By way of example, consider the case of a handover between one BSC, hereinafter "BSCold", and another BSC, hereinafter "BSCnew", connected to the same MSC (as will become apparent, the method to be described for correlating old and new SCCP connections relating to the same communication session across a hand-over, applies equally to the case where the MSC also changes). FIG. 10 illustrates the A-interface links involved in the hand-over, the related signalling connections between the BSCs and the mobile station being omitted for clarity. More particularly, mobile station 12 initially communicates with MSC 20 via BSCold 17A using an SCCP connection "SCCPold" established across A-interface link 68 by an initial message 70; after hand-over, the mobile station communicates with MSC 20 via BSCnew 17Z using an SCCP connection "SCCPnew" established across A-interface link 69 by a handover request message 72. Links 68 and 69 are monitored by respective monitor probes 40A and 40Z, these probes being operative to detect hand-over related messages and to relate them, using the SCCP local references, to the connection records 51 established for the SCCP connections concerned.

FIG. 10 shows the message flows seen on SCCPold and SCCPnew during the course of a successful hand-over. It is BSCold 17A that makes the decision that a hand-over is required, this decision being based on information it receives from the mobile station. On deciding that a hand-over is required, BSCold 17A sends a BSSMAP Handover Required message 71 to the MSC 20. MSC 20 is responsible for making the decision to effect a handover and if it makes a positive decision, it opens SCCPnew to BSCnew 17Z and sends a BSSMAP Handover Request message 72 to BSCnew 17Z. BSCnew, after allocating a radio channel for the mobile station, answers with a BSSMAP Handover Request Acknowledge message 73 that contains a RR3 Handover Command signalling unit; this is the piece of information that will ultimately get passed to the mobile station to tell it, in terms of radio frequencies and timeslot number, where it is supposed to tune to.

On receiving the BSSMAP Handover Request Acknowledge message, MSC 20 puts the RR3 Handover Command into a BSSMAP Handover Command 74 which it sends over SCCPold to BSCold 17A; BSCold 17A forwards this message to the mobile station 12.

The mobile station then establishes contact with BSCnew 17Z using the radio channel allocated by the latter. Upon contact being successfully established, BSCnew sends a BSSMAP Handover Complete message 75 on SCCPnew to MSC 20 which then sends a BSSMAP Clear command 76 on SCCPold to BSCold 17A, this command including a 'handover successful' indication. SCCPold is thereupon terminated.

From the foregoing, it will be seen that the RR3 Handover Command signalling unit appears both on SCCPnew and SCCPold. Matching the parameter values of this signalling unit forms the basis of correlating SCCPnew and SCCPold. In fact, it is conceivable that two hand-overs could occur in a PLMN at substantially the same moment with the same RR3 Handover Command parameter values, in which case solely relying on these parameter values to effect SCCP connection correlation, whilst generally producing satisfactory results, will occasionally lead to ambiguity and possible errors (or at least inability to make a correlation). It is therefore preferred to effect correlation on the basis of both RR3 Handover Command parameters values and the cell ID of the cell from which the hand-over is being effected ("old cellID"); including this additional parameter in the match criteria makes it highly unlikely (though, in theory, not impossible) that an ambiguity will occur. The old CellID appears on SCCPold in the initial message 70 setting up SCCPold (if a BSC-internal handover subsequently occurs changing the operative cell without changing the SCCP connection, then the cell ID of the new cell is the one that must be used as the "old CellID" for correlating SCCP connections should a subsequent handover involve a change in BSC—this new "old CellID" can be ascertained from the BSSMAP handover Performed message, not illustrated, which a BSC will send to the associated MSC in the case of a BSC-internal handover). The old CellID appears on SCCPnew in the BSSMAP Handover Request message 72.

The process of correlating SCCPold and SCCPnew thus proceeds as follows:

Monitor 40A monitoring link 68

- (i) when a new SCCP connection is set up by an initial message, the monitor 40A creates a new connection record 51, extracts the old CellID from the initial message, and associates it with the newly-created connection record;
- (ii) upon a BSSMAP Handover Performed message (not shown) being detected by monitor 40A, it extracts the new cell ID and substitutes it for the old CellID associated with the connection record identified by the SCCP local references of the BSSMAP Handover Performed message 71;
- (iii) When the monitor 40A detects a BSSMAP Handover Command 74, it extracts the RR3 Handover Command parameter values and associates them with the relevant connection record (again, identified by the SCCP local references of the command 74);
- (iv) Upon the monitor 40A detecting a BSSMAP Clear Command 76, if the connection record 51 identified from the SCCP local references of the command 76 already has old CellID and RR3 Handover Command parameter values associated with it, the monitor 40A sends a Correlation Old message 80 to the central station 42 including the monitor ID, the old CellID, the parameter values of the RR3 Handover Command, and the current operation subscriber identity as held in the connection record 51. The connection record is then removed.

Monitor 40Z monitoring link 69

- (i) upon the MSC setting up SCCPnew, monitor 40Z creates a corresponding connection record 51 including at least one of the SCCP local references (if only the BSC local reference is stored as in the embodiment previously described, then this reference is taken from the BSCnew reply to the initial Connection set up message from the MSC).
- (ii) when a BSSMAP Handover Request message 72 is detected by monitor 40Z, it extracts the old CellID and associates it with the connection record identified by the appropriate SCCP local reference of the message 72;
- (iii) upon the monitor 40Z detecting a BSSMAP Handover Request Acknowledgement 73, it extracts the RR3 Handover Command parameter values and associates them with the record identified by the appropriate SCCP local reference of the message 73;

(iv) when a Handover Complete message 75 is detected by monitor 40Z, it checks whether the connection record identified by the appropriate SCCP local reference of the message 75 has associated old CellID and RR3 Handover Command parameter values—if these parameter values are present, the monitor 40Z sends a Correlation New message 81 to the central station 42 including the monitor ID, the old CellID, the parameter values of the RR3 Handover Command, and the SCCP local reference used to identify the connection record.

(v) where the central station 42 is able to correlate an SCCPold with an SCCPnew monitored by monitor 40Z (see below regarding how this is done), the monitor 40Z receives in due course a Correlation Complete message 82 that contains the SCCPnew connection and the operative subscriber identity from the corresponding SCCPold connection. The monitor 40Z uses the SCCP local reference in message 82 to locate the corresponding connection record 51 and then inserts the operative subscriber identity into the record.

Central Station 42

(i) Station 42 maintains two correlation tables, these being an Old correlation table 85A each entry of which holds the contents of a corresponding Correlation Old message 80, and a New correlation table 85Z each entry of which holds the contents of a corresponding Correlation New message 81. Each entry in tables 85A and 85Z has an associated timestamp corresponding to the time of entry creation.

(ii) When a Correlation Old message 80 is received, the station 42 checks the New correlation table 85Z for any entry having the same values of old CellID and RR3 Handover Command parameter values. If no match is found, the contents of the Correlation Old message 80 are entered in table 85A. However, if a match is found, a Correlation Complete message 82 is generated and sent to the monitor 40Z identified in the entry held in table 85Z; this entry is thereafter cancelled.

(iii) When a Correlation New message 81 is received, the station 42 checks the Old correlation table 85A for any entry having the same values of old CellID and RR3 Handover Command parameter values. If no match is found, the contents of the Correlation New message 81 are entered in table 85Z. However if a match is found, a Correlation Complete message 82 is generated and sent to the monitor 40Z identified in the Correlation New message 81; the relevant entry in the Old table 85A is then cancelled.

(iv) Periodically, the tables 85A and 85Z are scanned and any entries older than a predetermined threshold, as judged from their timestamps, are deleted. This predetermined threshold is set by the maximum delay likely to occur between related correlation messages 80 and 81. In this way, any unmatched table entries are periodically removed.

The handover operation may, of course, fail for a number of different reasons and the monitors 40 need to be able to detect and handle such situations (generally, station 42 will be unaware of attempted handovers that fail). Thus, if BSCnew 17Z returns a BSSMAP Handover Failure message instead of a BSSMAP Handover Request Acknowledge 73, monitor 40Z on detecting this message is arranged to remove its corresponding connection record 51, whilst monitor 40A is arranged to cancel the old CellID information associated with its connection record 51 for the relevant SCCPold connection.

After the BSSMAP Handover Command 74 has been passed to BSCold 17A, handover failure may occur for any of the following reasons:

(a) The mobile station 12 is unable to establish contact with BSCnew and reverts to the old radio channel. In this case, a BSSMAP Handover Failure will be passed from BSCold 17A to MSC 20 on SCCPold enabling monitor 40A to cancel the handover parameters associated with the corresponding connection record. The MSC then issues a BSSMAP Clear Command to BSCnew 17Z on SCCPnew; the monitor 40Z detects this command thereupon removes the corresponding connection record.

(b) The mobile station 12 fails to establish contact with BSCnew but does not revert to the old radio channel. In this case, a BSSMAP Clear Request is passed from BSCold 17A to MSC 20 on SCCPold in response to which MSC sends a BSSMAP Clear Command to both BSCold and BSCnew. Monitors 40A and 40Z detect the clear command and remove their corresponding connection records.

(c) The MSC decides to abort the handover procedure and sends a BSSMAP Clear Command to both BSCold and BSCnew on SCCPold and SCCPnew respectively. The monitors 40A and 40Z detect this command and remove their corresponding connection records.

The Clear Commands issued in the above cases will include cause codes enabling the various cases to be distinguished from one another.

It will be appreciated that the foregoing method of correlating SCCPold and SCCPnew does not rely on MSC 20 being the switching point for the handover so that switching could instead occur at an anchor MSC (the primary MSC involved in setting up a particular call—this MSC does not change throughout the call).

It may be noted that in the embodiment described above, tracking the SCCP connection across a handover does not alter the manner in which subscriber identity change reports are made by the monitors 40A and 40Z nor how such messages are handled at the central station 42.

Finally, it may also be noted that since the current location area of the mobile station is contained in the BSSMAP Handover Request message 72, this information can readily be extracted by monitor 40Z and inserted in the connection record 51 associated with SCCPnew. Because it is conceivable that the location area may be changed by the handover at the same time as the operative subscriber identity is left unchanged (where it is the IMSI and therefore valid in all location areas), monitor 40Z is arranged to generate a report message 54 of the location update type if it detects no TMSI Reallocation command within a predetermined period following the handover being successfully completed; this message may well be redundant but this will not cause any problems at the central station 42.

Second Embodiment

As already noted, the second embodiment of the identity-code tracking apparatus operates in a similar manner to the first embodiment but monitors messages on the Abis interface rather than the A interface and uses the channel number parameter to link messages relating to the same transaction. The channel number parameter identifies the channel type, TDMA offset and time slot number of the radio channel to be used on the air interface; the channel number parameter appears in certain messages on the Abis interface, either in a Channel Number information element or as part of a Channel Description information element.

By way of example of the operation of the second embodiment, consider again the location update transaction depicted in FIG. 4. The Location Update Request (line c) is carried on the Abis interface in an Establish Indication message that includes the Channel Number information element identifying the signalling channel previously assigned by the BSC concerned for handling the location update procedure. A monitor probe on the Abis interface detects this Establish Indication message, creates a record for the channel number concerned, and enters the operative subscriber identity contained in the Establish Indication message into the record. In due course, the same monitor probe detects a Location Update Accept (line h) for the same channel number, both the Location Update Accept and channel number being carried in information elements of a Data Request message. As a result, the monitor probe sends a report message back to a central station. The monitor probe also updates its record for the channel by recording the new operative subscriber identity contained in the Location Update Accept. In fact, as already indicated for the first embodiment, the sending of the report message and record updating may be delayed until after the corresponding TMSI Reallocation Complete message is detected, carried in a Data Indication message on the Abis interface. Finally, at the end of the location updating transaction, a Channel Release message is sent from the BTS to the mobile station; this release message is detected by the monitor probe which thereupon cancels the record it was maintaining for the channel concerned.

From the foregoing it can be seen that in respect of subscriber identity tracking, the general operation of the monitor probe, the form of the report message, and the operation of the central station can be substantially the same for the second embodiment as the corresponding components of the first embodiment. Accordingly, these components will not be described in detail for the second embodiment, it being apparent to a person skilled in the art what variations are necessary to adapt them to the specifics of the Abis interface.

The foregoing review of the second embodiment did not consider what happens in the case of a handover. However, before describing how handover is dealt with, another complication, this time specific to the second embodiment, will be mentioned. This complication is that even without a cell change, the allocated channel will be changed in the case where it is necessary to assign a traffic channel following initial allocation of a signalling channel. This change will of course result in a new channel number being assigned. Tracking of channel number changes can be effected by looking for an Assignment Command message passed from the BSC to the mobile station, this command being sent on the old channel and including details of the new channel to be used in a Channel Description information element. When a monitor probe detects the Assignment Command it modifies the record it is maintaining for the old channel number by changing the channel number to the new one.

Figure 11:
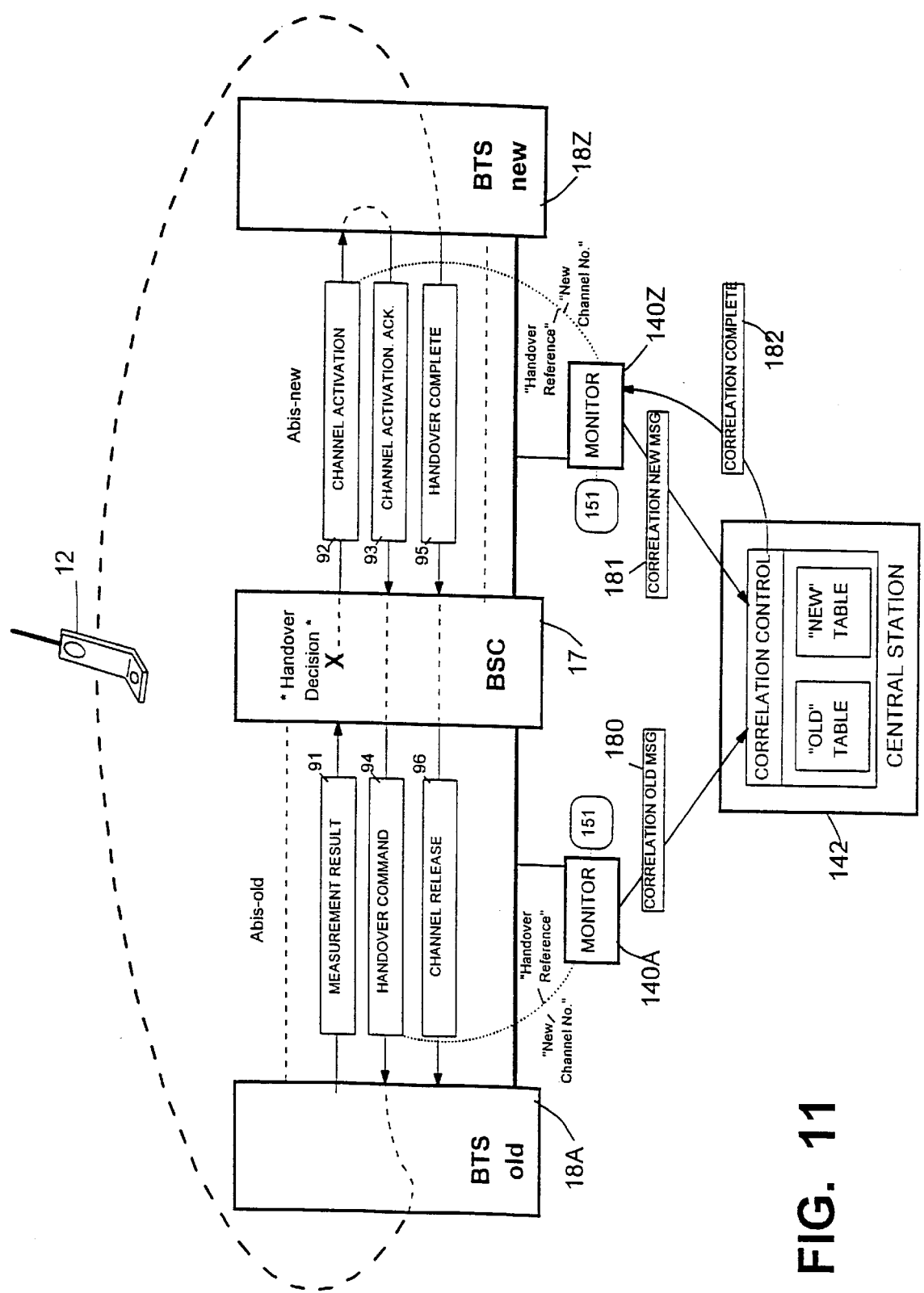
FIG. 11 is a diagram illustrating the signaling messages passed between a BSC and two BTSs of the FIG. 1 system during a handover operation involving a change in BTS.

Consideration will now be given as to how the second embodiment follows a procedure (transaction) across a handover. FIG. 11 illustrates the main messages exchanged with a BSC 17 when a mobile station 12 is handed over from one BTS (BTSold 18A) to another (BTSnew 18Z) connected to the same BSC 17. The Abis interface between BTSold 18A and BSC 17 is monitored by monitor probe 140A whilst the interface between BTSnew 18Z and BSC 17 is monitored by monitor probe 140Z.

BSC 17 makes its decision regarding handover based on radio signal measurements received from BTSold 18A in a Measurement Result message 91, this message indicating the channel to which it relates by the inclusion of the channel number of the mobile/BTSold channel. Upon deciding to initiate handover, BSC 17 sends a Channel Activation message 92 to the BTSnew 18Z and receives a Channel Activation Acknowledgement message 93 in return. The Channel Activation message contains the channel number of the channel to be used by BTSnew 18Z as well as a Handover Reference number; monitor 140Z on detecting the Channel Activation message, creates a new record 151 for the channel number identified in the message and associates the Handover Reference number of the message with that record 151.

After receiving the Channel Activation Acknowledgement message 93, BSC 17 sends a Handover Command 94 to BTSold 18A. The Handover Command message includes, of course, the channel number for the existing channel between BTSold and the mobile station. In addition, the Handover Command contains a Channel Description information element with the channel number of the channel to be used by BTSnew 18Z, and the Handover Reference number; both the channel number for BTSnew and the Handover Reference are extracted by monitor probe 140A and associated with the record 151 previously-established for the current channel between BTSold and the mobile station 12.

In due course, the mobile station changes to BTSnew and the latter sends a Handover Complete message 95 to BSC 17. On detecting this message, the monitor probe 140Z sends a Correlation New message 181 to central station 142 containing the channel number for BTSnew and the Handover Reference number. When the BSC receives the Handover Complete message it sends a Channel Release message 96 to BTSold. Monitor 140A detects this message and thereupon sends a Correlation Old message 180 to central station 142; this message contains not only the channel number for BTSnew and the Handover Reference number, but also the current operative subscriber identity. Central station 142 then uses the Correlation Old and Correlation New messages to associate the new channel with the old one and thereupon pass the operative subscriber identity to monitor 140Z for adding to the relevant record 151. The operation of station 142 is substantially the same as station 42 of FIG. 10; in particular, a timestamping mechanism is used to ensure that only the most recent Correlation Old and Correlation New messages are retained for matching thereby minimizing the risk of erroneous matches.

Monitor probe 140Z thereafter monitors the Abis interface between BSC 17 and BTSnew 18Z to detect messages relating to the new channel and identity any changes in operative subscriber identity in the manner already described.

It will be appreciated that apart from the different handover parameters detected by the monitors probes of the first and second embodiment, the monitor probes 140A,Z operate in substantially the same manner as the monitor probes 40A,Z in respect of handover following.

It will also be appreciated that the foregoing method of correlating the old and new channels associated with the same transaction does not rely on BSC 17 being the switching point for the handover so that switching could instead occur at an MSC or anchor MSC (in other words, the BTSold and BTSnew need not be connected to the same BSC).

Monitoring Subscriber Behavior

For a subscriber whose IMSI is contained in table 61, it is possible to monitor the behavior of that subscriber by passing the current operative subscriber identity (the TMSI entered for the subscriber's IMSI entry in table 61 or where no TMSI is present, the IMSI itself) to all monitor probes 40 and instructing the probes to monitor and report activity of interest. Should the operative subscriber identity change, then at the time the table 61 is updated, the central station 42 notifies the probes 40 of this new identity, the old identity to be watched being cancelled in the probes.

In fact, because the table 61 identifies the current location area of a subscriber, it is not necessary for all monitor probes 40 to be instructed to watch for subscriber activity; instead, only those probes 40 in the current location area indicated by table 61 need to be instructed. In this case, when the table 61 indicates that the mobile station has moved to a new location area, the watch is also transferred to that area by notifying the monitor probes in that location area, the probes 40 in the old location area being stood down.

In order to facilitate the triggering of probe updating in relation these watch functions, each IMSI entry in the table 61 can conveniently include a field indicating whether the corresponding subscribed is being watched. Whenever a table entry is updated, this field is checked and if this indicates that a watch is being maintained, appropriate probe updating is effected.

Variants

Various modifications are, of course, possible to the above described method for tracking identity-code changes. For example, the table 61 could be split into sub tables, one for each location area or association means other than a table data structure could be used to associate an IMSI with the current corresponding TMSI. Again, rather than explicitly looking for connection release messages to trigger removal of the connection records 51, provided the SCCP local references were made unique over a given time period greater than the maximum expected duration of a transaction, the removal of a record could be arranged to occur after a predetermined interval less than said given time period but longer than the usual maximum connection duration (in fact, having a time out for record removal may, in any case, be a useful housekeeping measure).

The identity tracking method can, of course, be applied to any appropriate cellular radio system and is not restricted in application to GSM-type systems.

With regard to tracking across handovers, it will be appreciated that rather than having the central station 42 carry out the correlation process, each monitor 40 can be arranged to carry out this correlation for its new SCCP connections (A interface) or channel numbers (Abis interface); in this case, each monitor 40 will send out Correlation Old messages to all other monitors and the Correlation New and Correlation Complete messages will no longer be required. Furthermore, following a communication transaction across a handover as described above may be effected for purposes other than tracking identity-code changes. For example, it may be desired to monitor transactions to ascertain how many involve handovers or how many involve multiple handovers.

We claim:

1. In a mobile radio system, a method of following across a handover a communication transaction between a mobile station and a fixed network part organized as a plurality of radio cells, the mobile radio system including a plurality of signaling paths for passing signaling messages to and from the mobile station with the particular signaling path in use depending on which one of said radio cell is being used for communication with the mobile station, this latter cell being changed by a said handover which, where it involves a change in said signaling path, results in at least one predetermined parameter appearing with the same value in said signaling messages on both the old and the new paths; said method comprising the steps of:

(a) monitoring a first said signaling path to detect signaling messages related to a first said communication transaction that is to be handed-over away from a cell served by that signaling path, and extracting from these messages the value of said at least one predetermined parameter;

(b) monitoring a second said signaling path to detect signaling messages relating to a second said communication transaction subject to hand-over towards a cell served by that signaling path, and extracting from these messages the value of said at least one predetermined parameter;

(c) comparing the values of the said at least one predetermined parameter extracted in steps (a) and (b) and if these values are the same, determining that said first and second communication transactions are the same transaction.

2. A method according to claim 1, wherein said at least one predetermined parameter is related to the control of the handover of said same transaction from the said cell served by said first signaling path to said cell served by said second signaling path.

3. A method according to claim 2, wherein said at least one predetermined parameter comprises radio frequency and timeslot parameters for communication between the mobile station and said cell served by said second signalling path.

4. A method according to claim 3, wherein said mobile radio system is of the GSM type and said signaling paths are across respective A interfaces, said radio frequency and timeslot parameters being extracted from RR3 Handover command signaling units that appear in BSSMAP Handover Command messages and BSSMAP Handover Request Acknowledgement messages respectively on said first and second signaling paths.

5. A method according to claim 4, wherein said at least one predetermined parameter further comprises a cell identity parameter for the said cell served by said second signaling path.

6. A method according to claim 2, wherein said at least one predetermined parameter comprises a channel number and a handover reference number.

7. A method according to claim 6, wherein said mobile radio system is of the GSM type and said signaling paths are across respective Abis interfaces, said channel number and handover reference number being extracted from a Handover Command message on said first signaling path and from a Channel Activation message on said second signaling path.

8. A method according to claim 7, wherein said at one predetermined parameter further comprises a new channel number parameter for communication between the mobile station and the said cell served by said second signaling path.

9. A method according to claim 1, wherein steps (a) and (b) each further involves sending the extracted value of said at least one predetermined parameter to a remote station, step (c) being performed at said remote station.

10. A method according to claim 1, further comprising the steps of:

deriving from the signaling messages on said first signaling path data related to said first communication transaction, and upon said first and second communication transactions being determined to be the same transaction in step (c), associating said data with the second communication transaction.

11. A method according to claim 10, wherein:

said step of deriving data related to said first communication transaction involves providing a record for said first communication transaction and storing said data therein, and said step of associating said data with the second communication transaction involves providing a record for said second transaction and storing said data therein.

12. A method according to claim 10, wherein said data is an operative identity code associated with said mobile station.

13. A method according to claim 12, wherein said operative identity code associated with said mobile station is a subscriber identity code.

14. A method according to claim 1, wherein steps (a) and (b) are concurrently effected for a plurality of said signaling paths with step (c) being carried out for first and second communication transactions that experience hand-over at substantially the same time.

15. Apparatus for monitoring a mobile radio system in order to follow across a handover a communication transaction between a mobile station and a fixed network part of the system that is organized as a plurality of radio cells, said mobile radio system including a plurality of signaling paths for passing signaling messages to and from the mobile station with the particular signaling path in use depending on which said radio cell is being used for communication with the mobile station, this latter cell being changed by a said hand-over which, where it involves a change in said signaling path, results in at least one predetermined parameter appearing with the same value in said signaling messages on both the old and the new paths; said apparatus comprising:

first monitoring means for monitoring a first said signaling path to detect signaling messages related to a first said comniunication transaction that is to be handed-over away from a cell served by that signaling path, said first monitoring means including means for extracting from these messages the value of said at least one predetermined parameter;

second monitoring means for monitoring a second said signaling path to detect signaling messages relating to a second said communication transaction subject to hand-over towards a cell served by that signaling path, said second monitoring means including means for extracting from these messages the value of said at least one predetermined parameter; and correlation means for comparing the values of the said at least one predetermined parameter extracted by said first and second monitoring means and if these values are the same, determining that said first and second communication transactions are the same transaction.

16. Apparatus according to claim 15, wherein said at least one predetermined parameter is related to the control of the handover of said same transaction from the said cell served by said first signaling path to said cell served by said second signaling path.

17. Apparatus according to claim 15, wherein said correlation means is remotely located from said first and second monitoring means, said first and second monitoring means each including respective means for sending the value of said at least one predetermined parameter extracted by the monitoring means to said correlation means.

18. Apparatus according to claim 15, further comprising:

means for deriving from the signaling messages on said first signaling path data related to said first communication transaction, and means for associating said data with the second communication transaction upon said first and second communication transactions being determined to be the same transaction by said correlation means.

19. Apparatus according to claim 15, comprising a plurality of monitoring means for concurrently monitoring a plurality of said signaling paths, said correlating means being operative to seek to match communication transactions that experience hand-over at substantially the same time.

20. Apparatus for monitoring a mobile radio system in order to enable the following across a handover of a communication transaction between a mobile station and a fixed network part of the system that is organized as a plurality of radio cells, said mobile radio system including a plurality of signaling paths for passing signaling messages to and from the mobile station with the particular signaling path in use depending on which said radio cell is being used for communication with the mobile station, this latter cell being changed by a said hand-over which, where it involves a change in said signaling path, results in at least one predetermined parameter appearing with the same value in said signaling messages on both the old and the new paths; said apparatus comprising:

monitoring means for monitoring a said signaling path to detect signaling messages related to a said communication transaction involved in a handover;

extracting means for extracting from the messages monitored by said monitoring means the value of said at least one predetermined parameter; and means for sending the value of said at least one predetermined parameter extracted by the monitoring means to a correlation station.

* * * * *